US008856032B2

(12) United States Patent
Carlegren et al.

(10) Patent No.: US 8,856,032 B2
(45) Date of Patent: Oct. 7, 2014

(54) ADJUSTMENT OF A SECURITY LEVEL OF A SELF-CHECKOUT SYSTEM BASED ON SHOPPER ASSISTANT INTERVENTION

(75) Inventors: Fredrik Carlegren, Charleston, SC (US); Gregory H. Delott, Raleigh, NC (US); Jeffrey J. Smith, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 259 days.

(21) Appl. No.: 13/018,947

(22) Filed: Feb. 1, 2011

(65) Prior Publication Data

US 2012/0197741 A1    Aug. 2, 2012

(51) Int. Cl.
| | |
|---|---|
| G06Q 20/00 | (2012.01) |
| G06K 15/00 | (2006.01) |
| G07F 9/02 | (2006.01) |
| G07G 1/00 | (2006.01) |
| G07G 3/00 | (2006.01) |
| G06Q 99/00 | (2006.01) |
| G06Q 20/20 | (2012.01) |

(52) U.S. Cl.
CPC ............... *G06Q 20/20* (2013.01); *G07F 9/026* (2013.01); *G07G 1/0036* (2013.01); *G07G 3/006* (2013.01); *G06Q 99/00* (2013.01)
USPC ............................................. 705/16; 235/383

(58) Field of Classification Search
USPC .......................... 705/7.11, 7.13, 16; 235/383
See application file for complete search history.

(56) References Cited

U.S. PATENT DOCUMENTS

| | | | |
|---|---|---|---|
| 5,902,984 A * | 5/1999 | Planke | 235/381 |
| 5,952,642 A * | 9/1999 | Lutz | 235/383 |
| 6,047,262 A * | 4/2000 | Lutz | 705/16 |
| 6,991,066 B2 | 1/2006 | Persky | |
| 7,044,370 B2 | 5/2006 | Bellis, Jr. et al. | |
| 7,673,797 B2 | 3/2010 | Edwards | |
| 7,866,546 B1 * | 1/2011 | Vance | 235/379 |
| 2002/0148896 A1 * | 10/2002 | Persky et al. | 235/383 |
| 2002/0170782 A1 * | 11/2002 | Millikan | 186/61 |
| 2003/0024982 A1 * | 2/2003 | Bellis et al. | 235/383 |
| 2004/0133477 A1 * | 7/2004 | Morris et al. | 705/21 |
| 2007/0100677 A1 * | 5/2007 | Boss et al. | 705/9 |
| 2007/0175988 A1 | 8/2007 | Martin | |
| 2008/0001747 A1 * | 1/2008 | Kangas | 340/572.1 |
| 2009/0066515 A1 * | 3/2009 | Kangas | 340/572.1 |
| 2011/0072132 A1 * | 3/2011 | Shafer et al. | 709/224 |
| 2011/0231331 A1 * | 9/2011 | Smith | 705/325 |

OTHER PUBLICATIONS

Shrink and Self Checkout: Trends, Technology and Tips, International Business Machines Corporation, Somers, New York, 2008.

* cited by examiner

*Primary Examiner* — Seye Iwarere
(74) *Attorney, Agent, or Firm* — Olive Law Group, PLLC (57) ABSTRACT

Methods and systems for adjusting a security level of a self-checkout system based on shopper assistant intervention are disclosed. According to an aspect, a method includes deducing that shopper assistant intervention occurs in a self-checkout environment based on detection of one or more events in a self-checkout system. The events may occur at shopper terminals of the self-checkout system and may require attention of a shopper assistant monitoring the shopper terminals. The method also includes adjusting a security level of the self-checkout system in response to deducing that shopper assistant intervention occurs. Further, the method may include implementing a predetermined action in response to adjusting the security level of the self-checkout system.

21 Claims, 4 Drawing Sheets

ADJUSTMENT OF A SECURITY LEVEL OF A SELF-CHECKOUT SYSTEM BASED ON SHOPPER ASSISTANT INTERVENTION

BACKGROUND

1. Field of the Invention

The present invention relates to electronic transactions, and more specifically, adjustment of a security level of a self-checkout system.

2. Description of Related Art

Self-checkout systems have become common in retail stores for providing shoppers with the ability to pay for purchases from a retailer without direct input to the checkout process by retailer personnel. Such systems are an alternative to traditional cashier-staffed checkout systems. In self-checkout systems, shoppers are permitted to scan barcodes on their items or products for identifying items to be purchased. Items such as fruits and vegetables may be weighed with a scale and manually identified with a user interface device, such as a touchscreen display. Shoppers may bag items in a bagging area, and a weight observed in the bagging area may be verified against previously stored information to ensure that the correct item is bagged, allowing the shopper to proceed only if the observed and expected weights match. Some self-checkout systems also include devices for verifying that the dimensions of an item match an entered identification of the item.

Self-checkout systems typically include multiple shopper terminals that must be monitored by a shopper assistant. The shopper assistant is responsible for helping shoppers with purchases and for security of the self-checkout environment. Particularly, for example, shopper assistants monitor the self-checkout environment, including multiple shopper terminals, for possible theft attempts. A shopper assistant may be called for intervention at a shopper terminal if a shopper needs assistance with a transaction, or if a security alert indicates that an item at a shopper terminal does not match a stored weight or dimension for the item. As a result of the intervention, the shopper assistant's attention may be diverted away from other terminals, and this may lead to an increased risk of theft at other shopper terminals.

For at least the aforementioned reasons, it is desired to provide systems and methods for aiding shopper assistants in monitoring self-checkout environments.

BRIEF SUMMARY

One or more embodiments of the present invention provide methods and systems for adjusting a security level of a self-checkout system based on shopper assistant intervention. According to an aspect, a method includes deducing that shopper assistant intervention occurs in a self-checkout environment based on detection of one or more events in a self-checkout system. The events may occur at shopper terminals of the self-checkout system and may require attention of a shopper assistant monitoring the shopper terminals. The method also includes adjusting a security level of the self-checkout system in response to deducing that shopper assistant intervention occurs. Further, the method may include implementing a predetermined action in response to adjusting the security level of the self-checkout system.

DETAILED DESCRIPTION

Exemplary systems and methods for adjusting security levels of self-checkout systems based on shopper assistant intervention in accordance with embodiments of the present invention are disclosed herein. Particularly, described herein are systems and methods configured to deduce that shopper assistant intervention has occurred in a self-checkout environment. For example, a system may deduce the occurrence of shopper assistant intervention based on detection of one or more events in a self-checkout system, including, but not limited to, a shopper help event, a product checkout alert, a shopper checkout timing event, a payment rejection, an age verification event, an event indicating that a shopper assistant has left a shopper monitoring area, and an event requiring human or remote system attention. Such events may be detected by monitoring events reported by one or more shopper terminals in a self-checkout system. The system may adjust a security level of the self-checkout system in response to deducing that shopper assistant intervention occurs. For example, the system may set the security level of the self-checkout system to one of several security levels, and may implement a predetermined action associated with the security level. Example actions that may be implemented include, but are not limited to, requesting help from another shopper assistant, and adjusting product checkout criteria of one or more shopper terminals.

Figure 1:
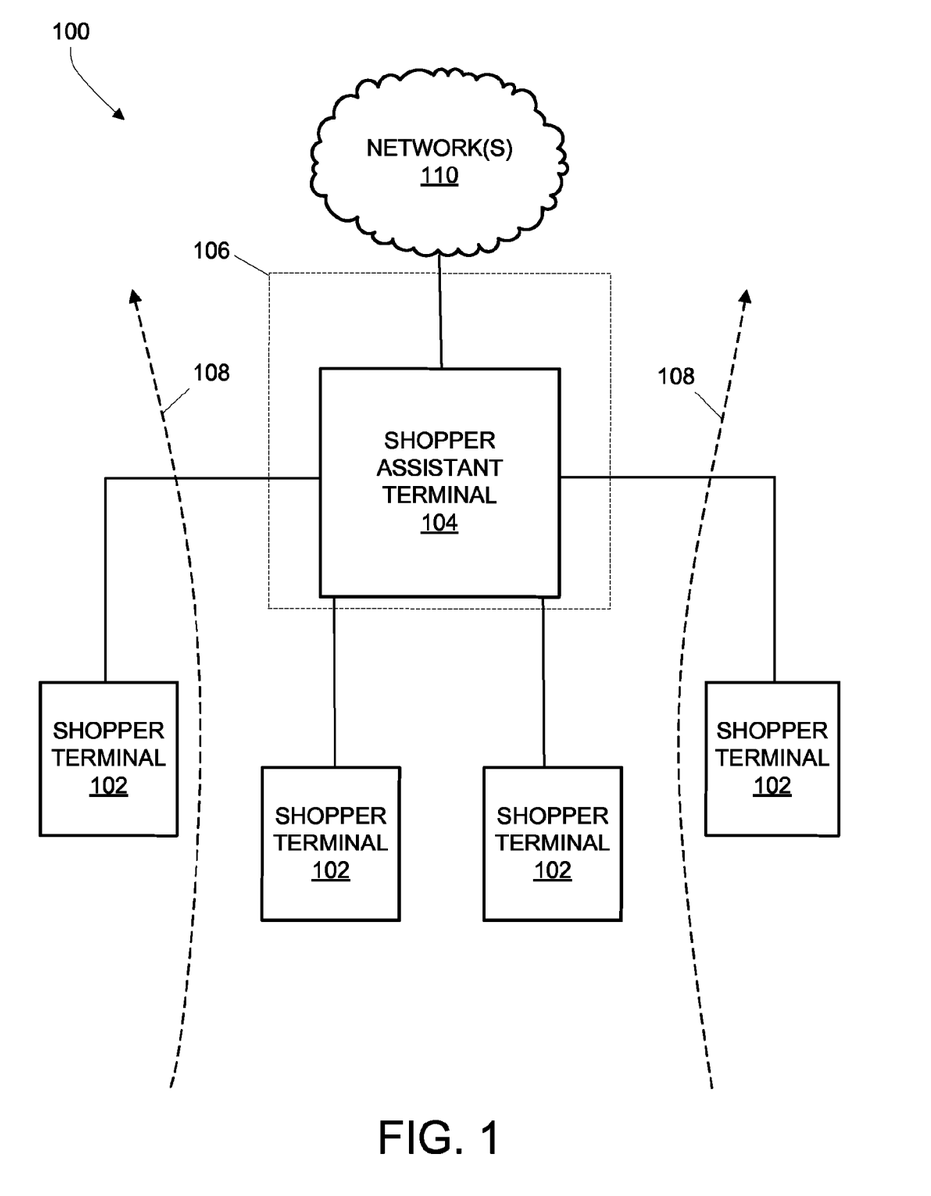
FIG. 1 is a plan view of a self-checkout environment including a self-checkout system operating therein according to embodiments of the present invention.

FIG. 1 illustrates a plan view of a self-checkout environment 100 including a self-checkout system operating therein according to embodiments of the present invention. The self-checkout environment may be located within a retail store for implementing shopper self-checkout services. Referring to FIG. 1, the self-checkout system may include multiple shopper terminals 102 and a shopper assistant terminal 104 located within a shopper monitoring area 106. The self-checkout system may include one or more other computing devices or systems that are not shown in FIG. 1 and that are in wired or wireless communication with terminals 102 and 104 for use in implementing embodiments of the present invention disclosed herein. Shoppers may move in the self-checkout environment 100 from an area within the retail store to the shopper terminals 102 where they may interact with the terminals for purchasing items. After completing a purchase transaction, the shoppers may move past the shopper assistant terminal 104 towards an exit of the retail store. The paths of shopper movement through the self-checkout environment 100 are generally indicated by direction arrows 108.

Each shopper terminal 102 may include a display for interfacing with shoppers. Particularly, the display may provide shoppers with purchase transaction information, such as itemized purchases and prices, a total cost associated with a purchase, and related purchase transaction information. Each shopper terminal 102 may include a processor executing software, such as a point-of-sale (POS) application. The shopper terminals 102 may communicate over one or more networks 110 with network entities, such as financial institutions. Purchases may be made via the shopper terminals 102 whereby the shopper terminals 102 facilitates electronic funds transfers over network(s) 110 between customer accounts for one or more financial institutions and an establishment that implements the shopper terminal 102 (i.e., a vendor). For this purpose, the shopper terminals 102 are communicatively coupled to network(s) 110.

The shopper terminals 102 are communicatively coupled to the shopper assistant terminal 104 or a centralized processor (not shown) configured to manage the shopper terminals 102 within the self-checkout environment 100. The shopper assistant terminal 104 or centralized processor may provide pricing information for purchasing items or products scanned by scanner 110 at the shopper terminals 102. In an example, a shopper may scan an item for purchase using the scanner 110. In response to scanning the item, the scanner 110 may transmit universal product code (UPC) information from the scanned purchase item to the shopper assistant terminal 104 or a centralized processor. The shopper assistant terminal 104 or centralized processor may search a UPC database for the UPC information and may return a price for the item to the shopper terminal 102. These and other functions may be performed by the shopper assistant terminal 104 or the centralized processor.

The shopper assistant terminal 104 may be directly coupled to each shopper terminal 102. For example, the shopper assistant terminal 104 may be communicatively coupled to the shopper terminals 102 via cabling, wireless local area network (WLAN), or the like. In another example, the shopper assistant terminal 104 may be indirectly coupled to the shopper terminals 102 via one or more network(s) 110. Network(s) 110 may include any suitable type of network such as, but not limited to, wireless, wireline, or combinations thereof. Network(s) 110 may include, but is not limited to, a LAN, wide area network (WAN), Internet, and the like.

During normal operations in the self-checkout environment 100, a shopper assistant is positioned within or near the shopping monitoring area 106 for operating the shopper assistant terminal 104, and for monitoring self-checkout purchases at the shopper terminals 102. The shopper assistant terminal 104 may include a display and/or any other suitable user interface device for alerting the shopper assistant to events requiring intervention. For example, the shopper assistant terminal 104 may indicate that a shopper at one of the shopper terminals 104 may need assistance with a transaction. In this example, the shopper may interface with the shopper terminal to request help from the shopper assistant. In response the shopper terminal may send a message to the shopper assistant terminal 104 for notifying the shopper assistant that assistance may be needed. After receiving the alert, the shopper assistant may leave the shopping monitoring area 106 to provide assistance to the shopper at his or her respective shopper terminal 102. As a result of this shopper assistance intervention, the attention of the shopper assistant may be diverted away from the other shopper terminals 102, and therefore the risk of theft at the other shopper terminals increases. In accordance with embodiments of the present invention, the self-checkout system may deduce that shopper intervention has occurred based on the shopper help event, and may adjust a security level of the self-check system in response to the deduction, as described in more detail herein.

In another example of deducing shopper intervention, shopper intervention may be deduced based on detection of a product checkout event. In this example, one of the shopper terminals 102 may determine whether one or more measured specifications item (e.g., one or more of a weight, dimension, color, and the like) of an item being bagged by a shopper matches expected specifications of the item. Particularly, the shopper may scan an item, or otherwise enter input for identifying the item. The entered identification and measured specification(s) may be verified against previously stored information to determine whether the correct item is being bagged. If the measured specification(s) for the item matches the stored specification(s) within a tolerance range, the checkout may proceed without notification to the shopper assistant terminal 104. If the measured specification(s) for the item does not match stored specification(s) within the tolerance range, the shopper terminal 102 may send a message to the shopper assistant terminal 104 for notifying the shopper assistant of a product checkout event. After receiving notification of the event, the shopper assistant may leave the shopping monitoring area 106 to go to the respective shopper terminal 102. As a result of this shopper assistance intervention, the attention of the shopper assistant may be diverted away from the other shopper terminals 102. In accordance with embodiments of the present invention, the self-checkout system may deduce that shopper intervention has occurred based on the shopper help event, and may adjust a security level of the self-check system in response to the deduction, as described in more detail herein.

In another example of deducing shopper intervention, shopper intervention may be deduced based on detection of a shopper checkout timing event. In this example, one or more processes or steps involved in transactions at one of the shopper terminals 102 may be timed. If the time of the process or step exceeds a predetermined period of time, a shopper checkout timing event may be triggered and may be reported to the shopper assistant terminal 104. Examples of timed events include, but are not limited to, scanning items, bagging items, and entering purchase information. The shopper assistant may be notified of the shopper checkout timing event, and may be required to leave the shopping monitoring area 106 to go to the respective shopper terminal 102 for assisting the shopper. In accordance with embodiments of the present invention, the self-checkout system may deduce that shopper intervention has occurred based on the checkout timing event, and may adjust a security level of the self-check system in response to the deduction, as described in more detail herein.

In another example of deducing shopper intervention, shopper intervention may be deduced based on detection of a payment rejection. In this example, a payment attempt at one of the shopper terminals 102 may be rejected. In this case, the shopper may need assistance. The payment rejection may be reported to the shopper assistant terminal 104 such that the shopper assistant is notified of the payment rejection. The shopper assistant may be required to leave the shopping monitoring area 106 to go to the respective shopper terminal 102 for assisting the shopper. In accordance with embodiments of the present invention, the self-checkout system may deduce that shopper intervention has occurred based on the checkout timing event, and may adjust a security level of the self-check system in response to the deduction, as described in more detail herein.

In another example of deducing shopper intervention, shopper intervention may be deduced based on detection of an age verification event. In this example, an item scanned by a shopper may require that the purchaser be of a certain age to purchase the item. For example, tobacco products and alcoholic beverages require age verification. In response to scanning the item at a shopper terminal, an age verification event may be triggered and reported to the shopper assistant terminal 104. In this case, the shopper assistant may be required to leave the shopping monitoring area 106 to go to the respective shopper terminal 102 for verifying an age of the shopper. In accordance with embodiments of the present invention, the self-checkout system may deduce that shopper intervention has occurred based on the checkout timing event, and may adjust a security level of the self-check system in response to the deduction, as described in more detail herein.

In another example of deducing shopper intervention, shopper intervention may be deduced based on detection that a shopper assistant has left a shopper monitoring area. The shopper assistant terminal 104 may detect an event indicating that the shopper assistant has left the shopper monitoring area 106. For example, the shopper assistant may enter input into the terminal for indicating that he or she is leaving or has left the shopper monitoring area 106. In another example, the terminal 104 may include a platform upon which the shopper assistant may stand. In this example, the platform may signal when the shopper assistant has stepped off of the platform, and it can be presumed that the shopper assistant has left the shopper monitoring area 106. In accordance with embodiments of the present invention, the self-checkout system may deduce that shopper intervention has occurred based on detection of an event indicating that the shopper assistant has left a shopper monitoring area, and may adjust a security level of the self-check system in response to the deduction, as described in more detail herein.

In another example of detecting that a shopper assistant has left a shopper monitoring area, a wireless device may be configured to detect that a shopper assistant has left the shopper monitoring area. For example, the shopper assistant may carry a computing device in wireless communication with the shopper assistant terminal. The computing device and/or shopper assistant terminal may be configured to detect if the computing device has moved greater than a predetermined distance away from the shopper assistant terminal. In response to determining that the computing device has moved greater than the predetermined distant from the shopper assistant terminal, an event may trigger to indicate that the shopper assistant has left the shopper monitoring area.

Figure 2:
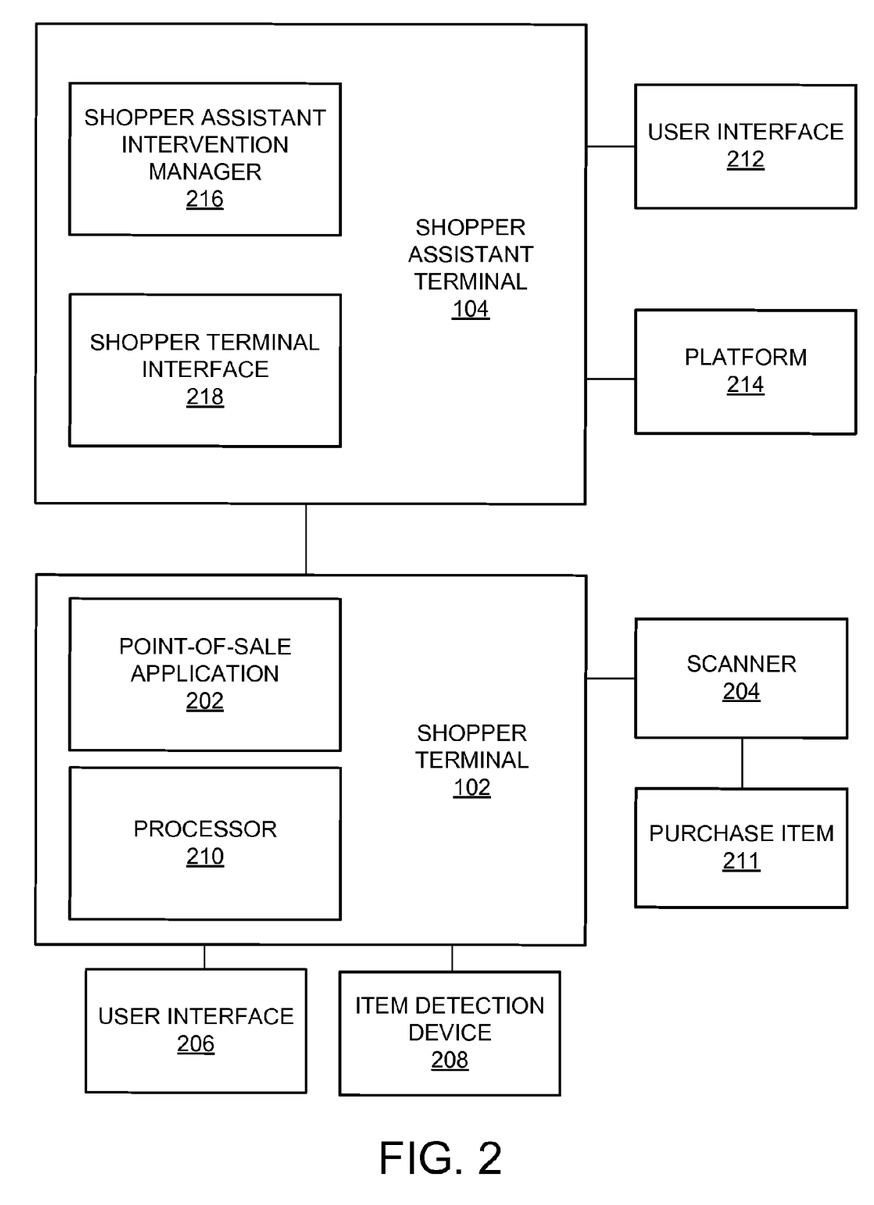
FIG. 2 is a block diagram of a self-checkout system according to embodiments of the present invention.

FIG. 2 illustrates a block diagram of a self-checkout system 200 according to embodiments of the present invention. The self-checkout system 200 may be implemented in a self-checkout environment such as, for example, the self-checkout environment shown in FIG. 1. Referring to FIG. 2, the self-checkout system 200 may include at least one shopper terminal 102 and at least one shopper assistant terminal 104. The self-checkout system 200 may include any number of terminals 102 and 104, and one each of these terminals is shown in FIG. 2 for convenience of illustration.

The shopper terminal 102 may include a POS application 202, and may be in communication with a scanner 204, a user interface 206, and an item detection device 208. The POS application 202 may execute on a processor 210 of the shopper terminal 102. The shopper terminal 102 may include any suitable hardware, software, and/or firmware for implementing functions and processes in accordance with embodiments of the present invention.

The scanner 204 may be capable of reading data from a purchase item 211. The scanner 204 may be a handheld device that can be passed over the UPC on products or may be built into a counter or platform whereby products are passed over the scanner. Further, the scanner 204 may read data from purchase items and transmit the data to the shopper terminal 102 via, for example, a wireless or wireline connection.

The item detection device 208 may include a scale, sensor, or other instrument that captures information relating to purchase items. In an example, the item detection device 208 may detect the presence of a purchase item at a bagging area. Further, for example, the item detection device 208 may capture weight, dimension, color, and/or other measurements of purchase items. The item detection device 208 may be communicatively coupled to the shopper terminal 102 via wireless or wireline elements (e.g., serial cable, 802.11 technologies, and the like).

The user interface 206 may include a keyboard device that enables a shopper to enter account and payment information for processing by the shopper terminal 102. For example, the user interface 206 may include a scanning device for reading a shopper's credit or debit card including account number. The keypad device may enable a shopper to enter a personal identification number (PIN) if using a debit card. The user interface 206 may include a display for displaying purchase and transaction information to the shopper. For example, the user interface 206 may be a touchscreen display for displaying text and graphics and for receiving user input. The user interface 206 may be communicatively coupled to the shopper terminal 102 via wireless or wireline elements.

The POS application 202 may be configured to detect events and report events to the shopper assistant terminal 104 in accordance with embodiments of the present invention. For example, the POS application 202 may detect a shopper help event, a product checkout alert, a shopper checkout timing event, a payment rejection, and an age verification event. The shopper terminal 102 may be communicatively connected to the shopper assistant terminal 104 for reporting these events to the terminal 104.

The shopper assistant terminal 104 may include a user interface 212, a platform 214, a shopper assistant intervention manager 216, and a shopper terminal interface 218. The shopper assistant terminal 104 may include hardware, software, and/or firmware for implementing functions and processes in accordance with embodiments of the present invention.

The user interface 212 may include a keyboard device that enables a shopper assistant to interact with the terminal 104. The user interface 212 may include a display or other presentation device for presenting information about the shopper terminal 102, such as information about events reported by the shopper terminal 102. The user interface 212 may be communicatively coupled to the terminal 104 via wireless or wireline elements.

The platform 214 may be positioned at the shopper monitoring area 106 shown in FIG. 1 where the shopper assistant can stand to view shopper activity at shopper terminals. The platform 214 may be capable to sense when the shopper assistant steps off of the platform. For example, the platform 214 may include a mechanism that is sensitive to the shopper assistant's weight on the platform 214 and signal to the terminal 104 when the shopper assistant has stepped off the platform 214 in accordance with embodiments of the present invention. The platform 214 may be communicatively coupled to the terminal 104 via wireless or wireline elements.

The shopper assistant intervention manager 216 may be configured to deduce that shopper assistant intervention occurs in a self-checkout environment in accordance with embodiment of the present invention. Particularly, the manager 216 may deduce that shopper assistant intervention occurs based on one or more events in the self-checkout system 200. The manager 216 may also adjust a security level of the system 200 in response to deducing that shopper assistant intervention has occurred. The manager 216 may monitor events occurring at the terminals 102 and 104. These events may be reported by the terminals 102 and 104 and may be used for deducing that shopper assistant intervention has occurred or is occurring. The shopper terminal interface 218 may be communicatively connected to the shopper terminals 104 for interfacing with the shopper terminals 104 and for receiving event reports from the shopper terminals 104.

Figure 3:
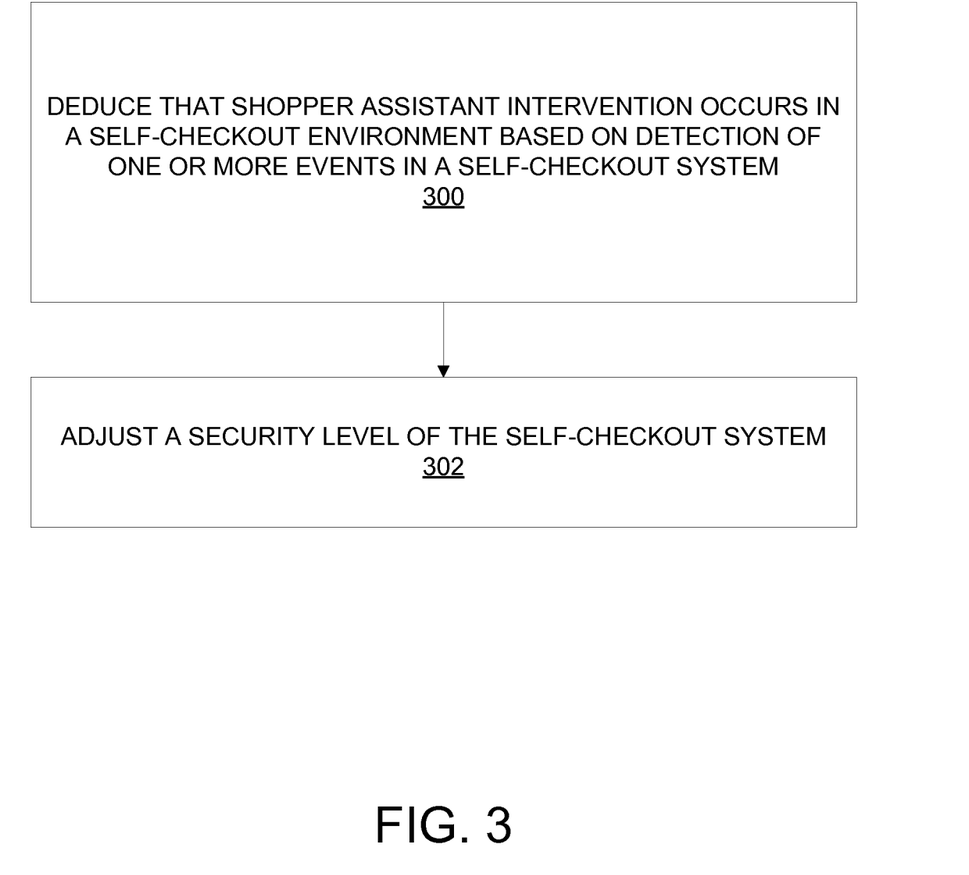
FIG. 3 is a flowchart of a method for adjusting a security level of a self-checkout system in accordance with embodiments of the present invention.

FIG. 3 illustrates a flowchart of a method for adjusting a security level of a self-checkout system in accordance with embodiments of the present invention. The method of FIG. 3 is described as being implemented by the self-checkout system 200 shown in FIG. 2, although the method may be implemented by any suitable self-checkout system. The method may be implemented by hardware, software, and/or firmware of the shopper assistant terminal 104 and/or another computing device, such as a server.

Referring to FIG. 3, the method includes deducing 300 that shopper assistant intervention occurs in a self-checkout environment based on detection of one or more events in a self-checkout system. For example, the shopper terminal interface 218 may receive event reports from the shopper terminal 102 or other shopper terminals. The reported events may be one or more of a shopper help event, a product checkout alert, a shopper checkout timing event, a payment rejection, an age verification event, and the like. Another example event occurring at the terminal 104 may be an indication that a shopper assistant has left a shopper monitoring area, such as, receipt of a signal from the platform 214 indicating that a shopper assistant has stepped off of the platform 214. The shopper assistant intervention manager 216 may detect the reporting of events. Further, the manager 216 may, in response to detecting one or more of the events, deduce that shopper assistant intervention occurs in a self-checkout environment based on detection of one or more events in a self-checkout system.

The method of FIG. 3 may include adjusting 302 a security level of the self-checkout system in response to deducing that shopper assistant intervention occurs. For example, the manager 216 may adjust the security level of the self-checkout system 200 in response to deducing that shopper assistant intervention has occurred or is occurring. The security level may be one of several security levels for the system 200. In an example, the system can be set to a security level based on one or more detected events. Each security level may define a predetermined action to be implemented when the system 200 is set to the security level. Example actions include, but are not limited to, requesting help from another shopper assistant, and adjusting product checkout criteria of one or more shopper terminals of a self-checkout system.

Figure 4:
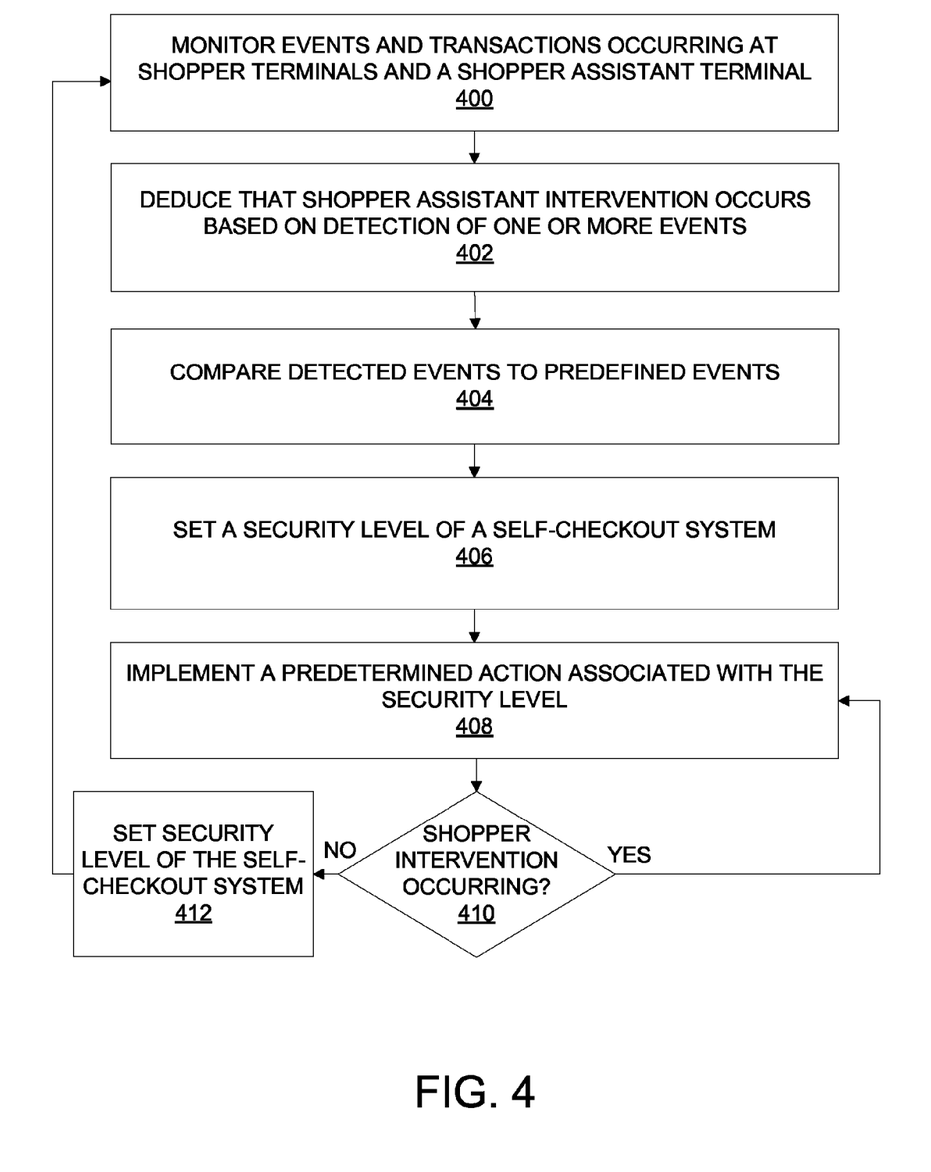
FIG. 4 is a flowchart of another method for adjusting a security level of a self-checkout system.

In accordance with embodiments of the present invention, FIG. 4 illustrates a flowchart of a method for adjusting a security level of a self-checkout system. The method of FIG. 4 is described as being implemented by the self-checkout system 200 shown in FIG. 2, although the method may be implemented by any suitable self-checkout system. The method may be implemented by hardware, software, and/or firmware of the shopper terminal 102, the shopper assistant terminal 104, and/or another computing device, such as a server.

Referring to FIG. 4, the method includes monitoring 400 events and transactions occurring at shopper terminals and a shopper assistant terminal. For example, the POS application 202 may monitor transactions and events and report events to the shopper assistant terminal 104 in accordance with embodiments of the present invention. In another example, the manager 216 may monitor events, such as a shopper assistant leaving a monitoring area.

The method of FIG. 4 includes deducing 402 that shopper assistant intervention occurs based on detection of one or more events in a self-checkout system. For example, the manager 216 may receive reporting of the events or otherwise receive notification of the events. The manager 216 may analyze one or more of the events to deduce that shopper assistant intervention is occurring or has occurred in a self-checkout environment. For example, a list of events may be stored at the shopper assistant terminal or another computing device. If an event is listed, the manager 216 may deduce that shopper assistant intervention has occurred or is occurring.

The method of FIG. 4 includes comparing 404 the one or more detected events to predefined events. Continuing the aforementioned example of a list of events, each event in the list may identify at least one security level among several security levels. The manager 216 may compare reported events to the events identified in the list. The method of FIG. 4 may include setting 406 a security level of the self-checkout system to the security level associated with a listed event that matches the reported event. In response to matching a report event to a listed event, the manager 216 may set the security level of the system 200 to the security level associated with the listed event that matches the reported event.

In accordance with embodiments of the present invention, a security level may be adjust or set for a self-checkout system as a whole or for one or more specified shopper terminals. For example, a security level may be increased for all shopper terminals in response to a predetermined event occurring at any one of the shopper terminals. In another example, a security level may be adjusted for one or more shopper terminals in response to a predetermined event occurring at another one of the shopper terminals. In another example, a security level for the entire system may be adjusted in response to an event occurring at the shopper assistant terminal.

The method of FIG. 4 includes implementing 408 a predetermined action associated with the security level. For example, in response to setting a self-checkout system or terminal to a security level, the manager 216 may implement a predetermined action. Continuing the aforementioned example of a list of events, the list may specify that the security level is associated with the predetermined action. In accordance with embodiments of the present invention, an example action includes requesting help from another shopper assistant. An example action for requesting for help from another shopper assistant may include, but is not limited to, the shopper assistant terminal 102 sending a communication to a computing device of another shopper assistant to request help. In another example, an action for requesting help may include the shopper terminal 102 using a speaker to play a recording for requesting help from another shopper assistant.

The method of FIG. 4 includes determining 410 whether shopper intervention is still occurring. For example, a shopper terminal that reported completion of an event upon which shopper intervention was deduced. In this example, upon completion of the event, the manager 216 may deduce that the shopper intervention is no longer occurring. In another example, after a predetermined time period from when an event was reported, the manager 216 may deduce that the shopper intervention is no longer occurring. In response to determining that shopper intervention is still occurring, the method may continue to implement 408 the predetermined action.

In response to determining that shopper intervention is not occurring, the method of FIG. 4 may set 412 the security level of the self-checkout system to another security level. For example, the security level may be set to the security level that the system was set to prior to the shopper assistant intervention. The method of FIG. 4 may then proceed to monitoring 400 events and transactions.

In accordance with embodiments of the present invention, another example action includes adjusting product checkout criteria of one or more shopper terminals. For example, an action may include increasing a match level required to verify a product or item when comparing a measurement of the product or item and product checkout criteria. An item detection device 208 may capture weight, dimension, color, and/or other measurements of purchase items. The captured weight, dimension, color, and/or other measurements may be compared to expected measurements of the item to determine if the item measurements are within a tolerance range. The action may include narrowing or reducing the tolerance range such that the item measurements must more closely match the expected measurements. If item measurements do not fit within the narrowed or reduced tolerance range, the corresponding transaction may be held up, or a notification may be sent to a shopper assistant terminal. As a result of this action, security of the system may be increased.

In accordance with embodiments of the present invention, security levels, actions to be implemented at security levels, and events of a self-checkout system may be configured based on user-defined criteria. For example, a user of a self-checkout system may generate or edit a security level list for associating one or more security levels in the list with an action as described herein. Further, for example, a user may specify events for association with one or more security levels in the list. In this example, when the specified event is detected or reported, the system will enter the security level associated with the specified event. If an action is associated with the security level, the system may implement the associated action.

In accordance with embodiments of the present invention, an association of a security level with an action may be based on user-defined criteria. For example, user-defined criteria may specify a plan of a self-checkout environment. Based on the plan, a user-defined action may adjust a product checkout criteria at one or more shopper terminals in a self-checkout system. For example, an action may include increasing a match level required to verify a product or item when comparing a measurement of the product or item and product checkout criteria. The match level may be increased at shopper terminals that are remote from a shopper terminal at which an event occurred requiring shopper assistant intervention. The plan of the self-checkout environment may be specified such that the system is aware of shopper terminal positioning with respect to one another. A security level at shopper terminals that are remote from the location of an event may be increased, because the shopper assistant may not easily monitor the remote shopper terminals while simultaneously handling an event requiring intervention.

In accordance with embodiments of the present invention, security levels may be set based on a number of shopper assistant interventions that are occurring. For example, a security level may be set based on whether there are no interventions occurring, one intervention occurring, or any number of interventions occurring in a self-checkout environment. Increased security may be provided if a high number of interventions are occurring. If no interventions are occurring, the system may be at a normal security level such that no actions are needed. A different action may be associated with each security level.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or diagrams of methods, apparatus (systems) and computer program products according to embodiments of the invention. For example, aspects of the present invention are described with reference to the diagrams of FIGS. 1 and 2 and the flowcharts of FIGS. 3 and 4. It will be understood that each block of the flowchart illustrations and/or diagrams, and combinations of blocks in the flowchart illustrations and/or diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   at a computing device comprising a processor and memory:
   deducing that shopper assistant intervention occurs in a self-checkout environment based on detection of at least one event in a self-checkout system;
   in response to deducing that shopper assistant intervention occurs, adjusting a security level at a first shopper terminal remote from a second shopper terminal of the self-checkout system at which the shopper assistant intervention occurs by:
      increasing a match level for a product checkout criteria required to verify a product at the first shopper terminal; and
      comparing a measurement of the product to the increased match level of the product checkout criteria at the shopper terminal to verify the product at the first shopper terminal.

2. The method of claim 1, wherein the self-checkout system comprises a plurality of shopper terminals,
   wherein the method comprises monitoring events reported by the plurality of shopper terminals, and
   wherein deducing that shopper assistant intervention occurs comprises deducing that shopper assistant intervention occurs based on the events reported by the plurality of shopper terminals.

3. The method of claim 1, wherein deducing that shopper assistant intervention occurs comprises deducing that shopper assistant intervention occurs based on detection of one or more of a shopper help event, a product checkout alert, a shopper checkout timing event, a payment rejection, an age verification event, an event indicating that a shopper assistant has left a shopper monitoring area, and an event requiring human or remote system attention.

4. The method of claim 1, wherein adjusting a security level at the first shopper terminal of the self-checkout system further comprises adjusting the security level based on the at least one event.

5. The method of claim 1, wherein adjusting the security level at the first shopper terminal of the self-checkout system further comprises setting the security level of the self-checkout system to one of a plurality of security levels.

6. The method of claim 5, wherein the security levels are each associated with at least one predetermined action.

7. The method of claim 6, comprising implementing the predetermined action associated with the one of the plurality of security levels in response to setting the security level of the self-checkout system to the one of the plurality of security levels.

8. The method of claim 6, comprising associating the plurality of security levels with the at least one predetermined action based on user-defined criteria.

9. The method of claim 8, wherein the user-defined criteria comprises one of a plan of the self-checkout environment and product checkout criteria.

10. The method of claim 1, further comprising requesting help from another shopper assistant.

11. A self-checkout system comprising:
    a shopper terminal interface configured to interface with a plurality of shopper terminals; and a shopper assistant intervention manager configured to:
- deduce that shopper assistant intervention occurs in a self-checkout environment based on detection of at least one event in the self-checkout system;
- adjust a security level at a first shopper terminal remote from a second shopper terminal in response to deducing that shopper assistant intervention occurs by increasing a match level for a product checkout criteria required to verify a product at the first shopper terminal; and
- compare a measurement of the product to the increased match level of the product checkout criteria at the shopper terminal the first shopper terminal.

12. The self-checkout system of claim 11, wherein the shopper assistant intervention manager is configured to:
- monitor events reported by the plurality of shopper terminals; and
- deduce that shopper assistant intervention occurs based on the events reported by the plurality of shopper terminals.

13. The self-checkout system of claim 11, wherein the shopper assistant intervention manager is configured to deduce that shopper assistant intervention occurs based on detection of one or more of a shopper help event, a product checkout alert, a shopper checkout timing event, a payment rejection, an age verification event, an event indicating that a shopper assistant has left a shopper monitoring area, an event requiring human or remote system attention.

14. The self-checkout system of claim 11, wherein the shopper assistant intervention manager is configured to adjust the security level at the first shopper terminal based on the at least one event.

15. The self-checkout system of claim 11, wherein the shopper assistant intervention manager is configured to set the security level to one of a plurality of security levels.

16. The self-checkout system of claim 15, wherein the security levels are each associated with at least one predetermined action.

17. The self-checkout system of claim 16, wherein the shopper assistant intervention manager is configured to implement the predetermined action associated with the one of the plurality of security levels in response to setting the security level of the self-checkout system to the one of the plurality of security levels.

18. The self-checkout system of claim 16, wherein the shopper assistant intervention manager is configured to associate the plurality of security levels with the at least one predetermined action based on user-defined criteria.

19. The method of claim 18, wherein the user-defined criteria comprises one of a plan of the self-checkout environment and product checkout criteria.

20. The self-checkout system of claim 11, further comprising requesting help from another shopper assistant.

21. A computer program product for adjusting a security level of a self-checkout system, said computer program product comprising:
- a non-transitory computer readable storage medium having computer readable program code embodied therewith, the computer readable program code comprising:
- computer readable program code configured to deduce that shopper assistant intervention occurs in a self-checkout environment based on detection of at least one event in the self-checkout system; and
- computer readable program code configured to:
  - adjust a security level at a first shopper terminal remote from a second shopper terminal of the self-checkout system in response to deducing that shopper assistant intervention occurs by increasing a match level for a product checkout criteria required to verify a product at the first shopper terminal; and
  - compare a measurement of the product to the increased match level of the product checkout criteria at a shopper terminal at the first shopper terminal.

* * * * *